United States Patent
McNeill

(10) Patent No.: US 6,375,401 B1
(45) Date of Patent: Apr. 23, 2002

(54) FASTENER SHANK CROSSECTION UTILIZING NON-CIRCULAR CONSTANT BREADTH CURVES

(75) Inventor: William A. McNeill, Crete, IL (US)

(73) Assignee: Continental/Midland, Inc., Park Forest, IL (US)

( * ) Notice: Subject to any disclaimer, the term of this patent is extended or adjusted under 35 U.S.C. 154(b) by 0 days.

(21) Appl. No.: 09/693,793

(22) Filed: Oct. 20, 2000

Related U.S. Application Data

(60) Provisional application No. 60/160,544, filed on Oct. 20, 1999.

(51) Int. Cl.[7] ................................. F16B 35/04
(52) U.S. Cl. ........................ 411/416; 411/411
(58) Field of Search ................. 411/416, 411, 411/386, 387.4, 424

(56) References Cited

U.S. PATENT DOCUMENTS

| 3,530,760 A | * | 9/1970 | Lindstrand |
| 3,875,780 A | * | 4/1975 | Cochrum |
| 3,935,785 A | * | 2/1976 | Lathom |

FOREIGN PATENT DOCUMENTS

GB 957675 * 5/1964

* cited by examiner

*Primary Examiner*—Flemming Saether
(74) *Attorney, Agent, or Firm*—Howard & Howard

(57) ABSTRACT

A fastener includes a head and a threaded shank. The shank defines an inner periphery and the thread defines an outer periphery. The shank and the thread each have a generally polygonal crossection with at least five lobes separated by at least five convex surfaces.

13 Claims, 2 Drawing Sheets

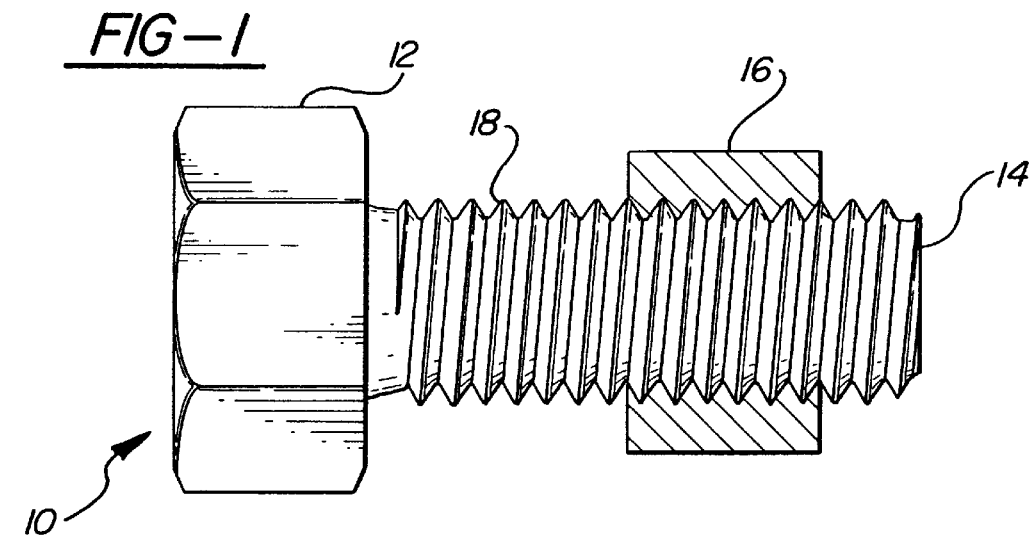
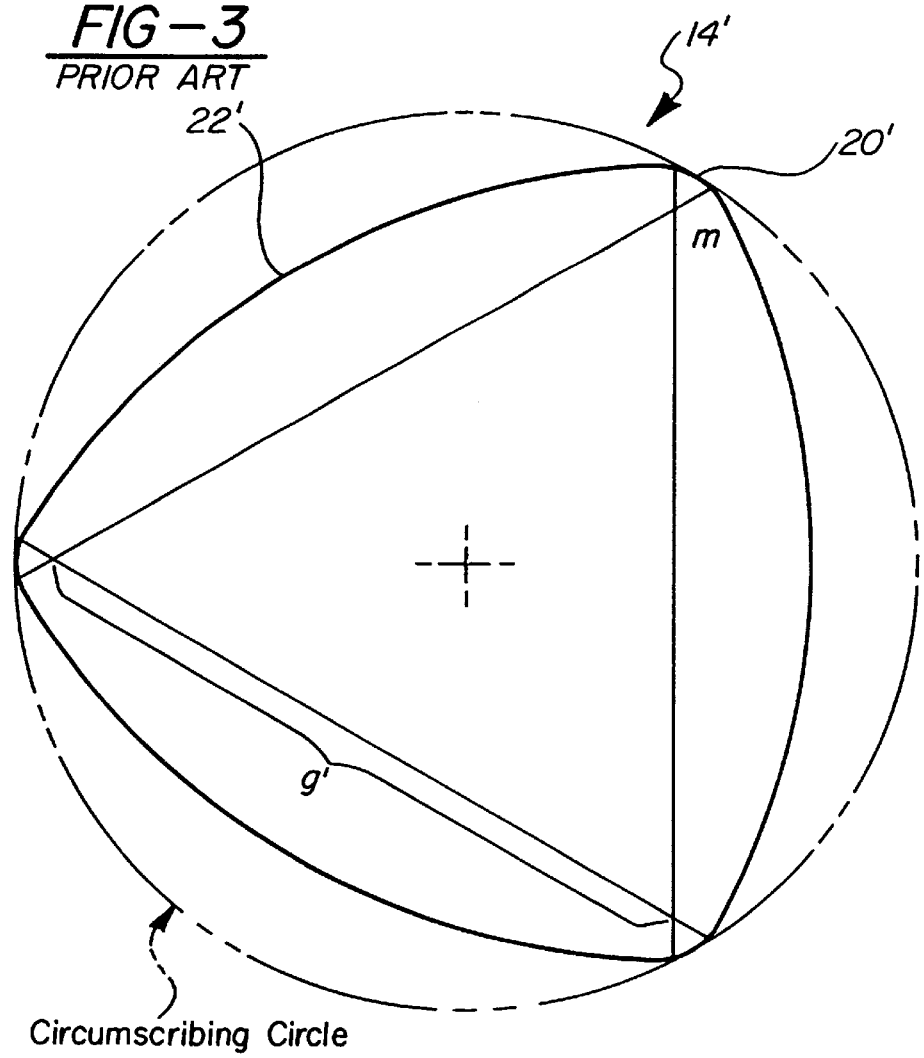

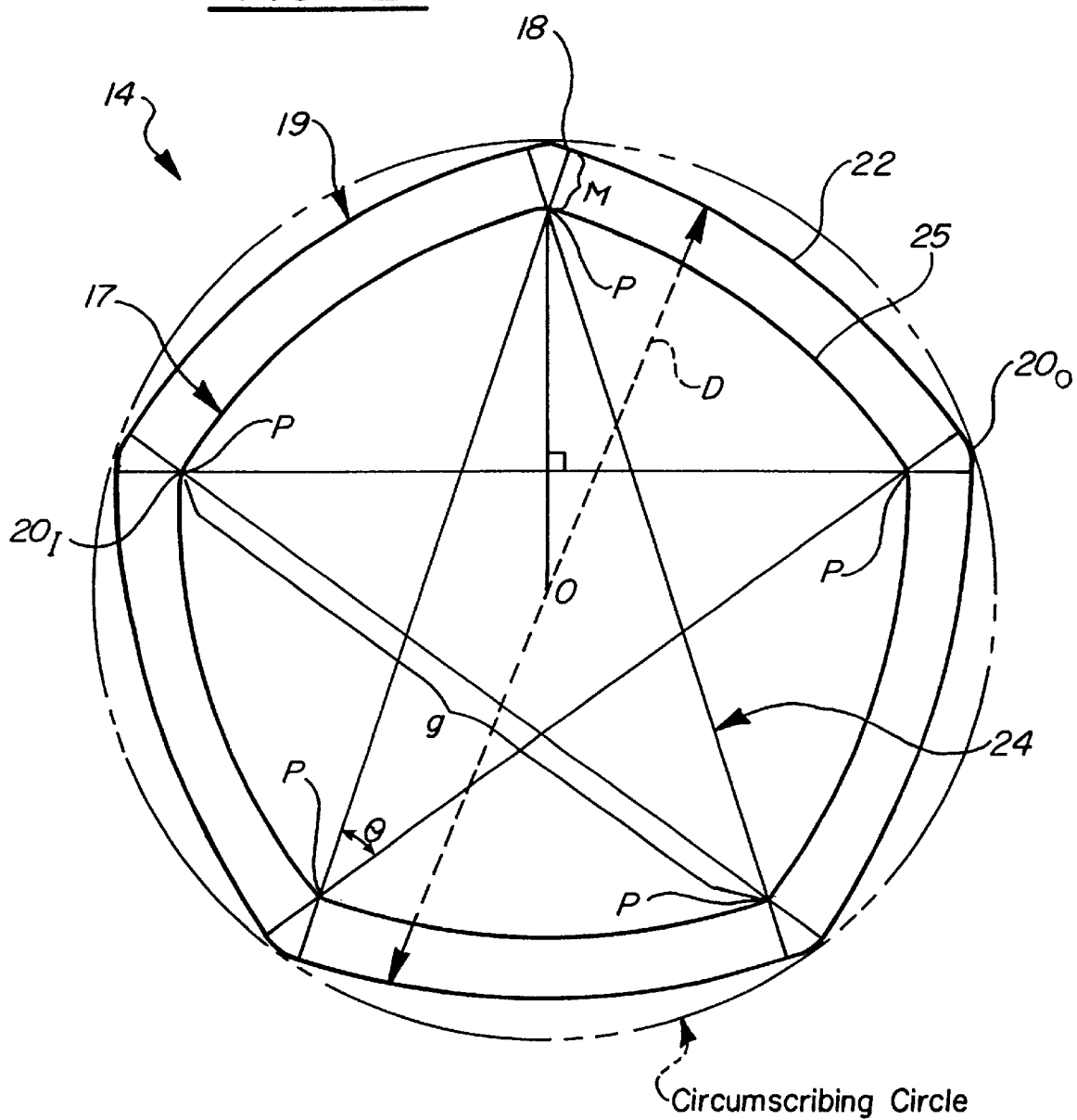

FASTENER SHANK CROSSECTION UTILIZING NON-CIRCULAR CONSTANT BREADTH CURVES

This application claims priority to provisional patent application Ser. No. 60/160,544, which was filed on Oct. 20, 1999.

BACKGROUND OF THE INVENTION

The subject invention relates to a fastener having a non-circular, treaded shank. Fasteners having threaded shanks include bolts for engaging nuts and screws for forming mating threads when driven into a round hole. It is known in the art, that the threaded shank must have a round crossection for proper thread to thread engagement with a nut or tapped hole A round crossection can be circular but does not as a necessity need to be circular. A, constant shank breadth (diameter) of a round shank is required for proper thread to thread engagements but a constant shank radius (measured from point O in FIG. 2) is not. In fact, for many fastener applications, a non-circular crossection is preferred to a circular crossection provided that the diameter is constant. A shank crossectional geometry having three evenly spaced lobes meets this requirement and is presently known in the art.

The introduction of lobes to a fastener shank crossectional geometry provides enhanced locking benefits particularly for a screw forming mating (nut) threads on the inner surface of a round hole. However, a Three lobe shank has inherent limitations. The three lobe geometry substantially reduces the crossectional area of the shank in manufacturing the lobular crossection by extrusion from circular raw material, thereby reducing overall shank strength. Further, the threads on a three lobe shank have less contact area with the threads on a nut, which can lead to thread shearing resulting in the loss of engagement with the nut. Still further, the three lobe geometry for a thread-forming screw is known, in some instances, to cause unnecessary damage to the substrate of an untapped hole because of the relatively large variation in radius around the circumference. Still further, a three lobe shank is difficult to manufacture because of a significant reduction in crossection area of the shank that is required for forming the three lobe geometry by extrusion, starting with a circular crossection.

SUMMARY OF THE INVENTION AND ADVANTAGES

The present invention discloses a threaded fastener which includes a head and a threaded shank. The shank includes a helical rib forming a thread, wherein the shank includes a generally polygonal crossection defining a constant breadth. The generally polygonal shape includes at least five lobes separated by at least five intermediate convex surfaces.

The advantage of a five lobe design over a three lobe design is due to the increase in the crossectional area which yields a proportionately increased shank tensile strength. Additionally, the increased crossectional area increases the thread to thread contact area between mating external and internal threads, which reduces the potential for thread shear-out. The five lobe shank reduces the amount of damage caused to the substrate defining a hole into which threads are being formed. Finally, the five lobe shank requires less reduction in shank crossectional area during the manufacturing process, which improves manufacturing ease.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a longitudinal crossectional view of a threaded fastener engaging a nut;

FIG. 2 is a crossectional view of a shank of the subject invention showing a geometrical generating figure; and FIG. 3 is a crossectional view of the prior art showing a geometrical generating figure.

DETAILED DESCRIPTION OF THE PREFERRED EMBODIMENT

Referring to FIG. 1, a fastener is generally shown at 10 having a head 12 and a threaded shank 14 engaging a nut 16. The shank 14 includes a helical rib that forms a thread 18. As shown in FIG. 2, the shank 14 defines an inner periphery 17 and the thread 18 defines an outer periphery 19. The thread 18 includes a generally polygonal crossection preferably having at least five outer lobes $20_O$ and is separated by at least five outer convex surfaces 22. The shank 14 includes at least five inner lobes $20_I$ separated by five inner convex surfaces 25.

The five lobes $20_I$, of the inner periphery 17 and the five lobes $20_O$ of the outer periphery form the comers of a generally pentagonal crossection of the shank 14 of the present invention. As will be discussed below, the generally polygonal crossection of the inner periphery 17 and of the outer periphery 19 each have a constant breadth (diameter D) measured in any direction around 360° of the crossection, which is essential to provide the enhanced threaded shank 14 qualities offered by the present invention.

Each outer convex surface 22 includes the same radius from the point p as the other outer convex surfaces 2 and is positioned generally opposite a lobe $20_O$, $20_I$. The outer lobes $20_O$ have one common radius, and the outer convex surfaces 22 have a different common radius. The description of the radii for the outer lobes $20_O$ and for convex surfaces 22 of the outer periphery 19 will now be given. A penta star 24 can be drawn within the inner periphery 17 using points p shown in FIG. 2 and located at the corners of a regular pentagon. Lines formed between opposing points p are used as a generator for the pentagonal crossection. Each point p of the star defines the origin of the radius M of an outer lobe $20_O$.

The outer convex surface 22 have radii g+M, and also have an opposing point p as their points of origin. Convex surface 25 in FIG. 2 have radii of length g and also have points P as their origins. The outer periphery 19 is comprised of five equal outer lobes $20_O$ plus five equal convex surfaces 22 and is thus seen to be parallel to the inner convex surface 25 as described above. The two curved surfaces are separated by a constant distance M referred to as the margin. Thus, the inner convex surfaces 25 represent a minimum size of a constant-breadth crossection, namely, one having a margin of zero length. FIG. 3 shows the prior art triangular shaped shank crossection having a constant diameter. A triangle can be drawn as a generator for the triangular shaped crossection having a generator length of g'.

Geometric formulas show that the area of the pentagon (or star)—based crossection is greater than the area of a triangle-based crossection even when the circumscribing diameter and the generator length g are the same for both geometric figures. The different geometrically shaped crossections engage (or form) the same size nut 16 by virtue of their common circumscribing diameter. Because of the greater crossectional area of the pentagonal shape, it is apparent that tie pentagonal-based crossection produces a stronger shank 14 than does a triangular-based crossection. For example, the area and diameter of circumscribing circle for a five lobe 20 curve can be determined from the following equation:

$$\text{AREA} = \frac{\pi}{2}M^2 + \frac{\pi}{2}(g+M)^2 - 0.8123g^2$$

Circumscribing Diameter=2 g(0.52573+M/g)

g—generator length
M—margin

Assuming a value for g of 93.5 mm and a circumscribing diameter of 116.9 mm, the value for m for the pentagonal shape is 9.294 mm. The area can be determined by the above equation to be 9.632 mm$^2$.

Keeping the same value for g of 93.5 mm and the same circumscribing diameter of 116.9 mm as the pentagonal-based crossection discussed above, the value for M' for the triangular-based crossection is 4.468 mm. The area for the triangular-based shaped crossection and circumscribing diameter can be determined from the following formulas:

$$\text{AREA} = \frac{\pi}{2}m^2 + \frac{\pi}{2}(g+m)^2 - 0.866g^2$$

Circumscribing Diameter=2 g(0.57735+m/g)

The formula yields an area for the three lobe 20' crossection of 7,536 mm$^2$. Accordingly, the crossectional area for the five lobe 20 crossection 14 is 28% greater and thus yields a shank 14 that is 28% stronger than the three lobe crossectional shank 14.

A greater crossectional area also reduces the tendency for tread 18 shear-out by providing more thread to thread contact between the shank 14 and the nut 16. A numerical value for shear resistance of a lobular shaped fastener can be demonstrated by calculating the eccentricity of the crossectional area. Eccentricity is determined by the largest radius in the crossection divided by the smallest radius in the crossection. As the value of eccentricity increases, the contact decreases between the threads 18 and the nut, threads, Thus, a shank 14 having a higher eccentricity has less shear resistance. The eccentricity for a five lobe shank 14 can be determined by the following equation:

$$\text{Eccentricity} = \frac{(M/g) + 0.52573}{(M/g) + 0.47427}$$

g—generator length
M—margin

The eccentricity for the three lobe shank 14' is:

$$\text{Eccentricity} = \frac{(m/g) + 0.57735}{(m/g) + 0.42265}$$

Again comparing a five lobe 20 crossection with a three lobe 20' crossection, each having the same circumscribing diameter and the same generator length g, where the five lobe 20 crossection includes a value for g of 93.5 mm and a value of 116.9 mm for the circumscribing diameter. The five lobe eccentricity, according to the equation above is 1.09. The corresponding three lobe eccentricity with the same values of g and of the circumscribing diameter is 1.33. Accordingly, the five lobe 20 configuration yields greater thread to thread contact between the shank threads 18 and the nut threads and, therefore, reduces the potential for shear-out.

An additional advantage of low eccentricity of a shank 14 crossection is realized while driving a thread-forming screw 10. As is known in the art thread-forming screws carve a mating thread in the substrate into which the screw 10 is being driven. Lobular shanks 14 are known to carve a superior mating thread into a substrate compared to a circular shank 14 because the substrate can relax after a lobe 20 has passed during rotation of the fastener 10. A five lobe shank 14 provides additional relaxation cycles due to the higher number of lobes 20 than a three lobe shank 14'. Thus, the lower eccentricity of the five lobe shank 14 provides the benefit of causing less damage to the substrate when driving the thread-forming screw than does the three lobe shank 14'.

Further, manufacturing a five lobe shank 14 is easier than manufacturing a three lobe shank 14'. As stated above, the five lobe shank 14 has a greater crossectional area than does a corresponding three lobe shank 14. The first step of the fastener 10 manufacturing process is the reduction of crossectional area by extruding the shank 14 in a die from the original circular crossection down to the lobular crossection of a yet to be threaded shank. A three lobe shank 14', because it has a greater reduction in area, requires greater pressure and resulting in greater machine stress during manufacturing than does the five lobe shank 14. Reduced pressure offered by the five lobe design, during the shank 14 crossectional area reduction process reduces the manufacturing heat: and tool wear, which enhances manufacturing tool life.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fastener comprising:
   a head;
   a shank defining an inner periphery and having a helical rib forming a thread defining an outer periphery;
   said shank and said thread each including a crossection having at least five lobes separated by at least five convex surfaces; and
   wherein said crossection has the same breadth as measured at location around 360° of said crossection.

2. A fastener as set forth in claim 1 wherein each of said convex surfaces defined by said outer periphery includes a common radius.

3. A fastener as set forth in claim 2 wherein each of said convex surfaces defined by said inner periphery includes a common radius.

4. A fastener as set forth in claim 3 wherein said convex surface of said outer periphery is parallel to said convex surface of said inner periphery.

5. A fastener as set forth in claim 5 wherein adjacent of said convex surfaces of said inner periphery intersect at a center point (p).

6. A fastener as set forth in claim 5 wherein said lobes of said outer periphery are defined by a radius equal to the length (m) of said parallel space having a center about adjacent said center point (p).

7. A fastener as set forth in claim 3 wherein each of said lobes defined by said outer periphery includes a common radius.

8. A fastener as set forth in claim 7 wherein said lobes of said inner periphery define a pentagonal polygon.

9. A fastener as set forth in claim 8 wherein said convex surface of said outer periphery includes a radius defined by a said inner radius (g) plus a parallel space (m) between said inner and outer peripheries.

10. A fastener as set forth in claim 9 wherein said convex surfaces includes a length defined by an angle ($\phi$) formed between two lines intersecting at one of said center points (p).

11. A fastener as set forth in claim 1 wherein said shank includes a crossectional area defined by:

$$\text{AREA} = \frac{\pi}{2}m^2 + \frac{\pi}{2}(g+m)^2 - 0.8123g^2$$

wherein:
g—generator length
m—margin

12. A fastener as set forth in claim 1 wherein said shank includes a circumscribing diameter defined by:

Circumscribing Diameter=2 g(0.52573+m/g)

wherein:
g—generator length
m—margin

13. A fastener as set forth in claim 1 including an eccentricity defined by:

$$\text{Eccentricity} = \frac{(m/g) + 0.52573}{(m/g) + 0.47427}$$

wherein:
g—generator length
m—margin

* * * * *